(12) United States Patent
Kuwada et al.

(10) Patent No.: US 10,377,873 B2
(45) Date of Patent: Aug. 13, 2019

(54) EXPANDABLE ACRYLIC RESIN BEAD, EXPANDED ACRYLIC RESIN BEAD, AND EXPANDED ACRYLIC RESIN BEADS MOLDED ARTICLE

(71) Applicant: JSP CORPORATION, Chiyoda-ku (JP)

(72) Inventors: Yohta Kuwada, Mie (JP); Mitsushi Murata, Mie (JP)

(73) Assignee: JSP CORPORATION, Chiyoda-ku (JP)

( * ) Notice: Subject to any disclaimer, the term of this patent is extended or adjusted under 35 U.S.C. 154(b) by 0 days.

(21) Appl. No.: 15/554,842

(22) PCT Filed: Mar. 1, 2016

(86) PCT No.: PCT/JP2016/056261
§ 371 (c)(1),
(2) Date: Aug. 31, 2017

(87) PCT Pub. No.: WO2016/140223
PCT Pub. Date: Sep. 9, 2016

(65) Prior Publication Data
US 2018/0030233 A1    Feb. 1, 2018

(30) Foreign Application Priority Data
Mar. 2, 2015 (JP) .................. 2015-040572

(51) Int. Cl.
*C08J 9/20* (2006.01)
*C08J 9/14* (2006.01)
(Continued)

(52) U.S. Cl.
CPC ............. *C08J 9/20* (2013.01); *B29C 44/3461* (2013.01); *C08J 9/141* (2013.01); *C08J 9/16* (2013.01);
(Continued)

(58) Field of Classification Search
None
See application file for complete search history.

(56) References Cited

U.S. PATENT DOCUMENTS 4,689,243 A * 8/1987 Sasaki ...................... C08J 7/047
264/447
9,434,830 B2  9/2016 Goto et al.
(Continued)

FOREIGN PATENT DOCUMENTS

| JP | 50-22054 A | 3/1975 |
| JP | 57-182334 A | 11/1982 |

(Continued)

OTHER PUBLICATIONS

English Abstract of Fukui et al., JP 2002-128978, May 2002 (Year: 2002).*

(Continued)

*Primary Examiner* — Ronak C Patel
(74) *Attorney, Agent, or Firm* — Oblon, McClelland, Maier & Neustadt, L.L.P.

(57) ABSTRACT

Provided are an expanded acrylic resin beads molded article that produces little soot during burning, and has good castabilities and high strength, and an expandable acrylic resin bead and an expanded acrylic resin bead for producing the expanded acrylic resin beads molded article. The expandable acrylic resin bead includes a physical blowing agent and a copolymer. The copolymer is composed of a methyl methacrylate component, an acrylic acid ester component, and a styrene component in a predetermined proportion. The copolymer constitutes a base resin of the expandable acrylic resin beads. The water content of the expandable acrylic resin bead is a 0.5 mass % or less. The expanded acrylic resin bead includes the copolymer and has a bulk density and cell diameters within predetermined (Continued)

Example 1 ranges, and the expanded acrylic resin beads molded article is produced by in-mold molding of plural expanded beads.

4 Claims, 4 Drawing Sheets

(51) Int. Cl.
- *C08J 9/232* (2006.01)
- *C08J 9/16* (2006.01)
- *B29C 44/34* (2006.01)
- *B29K 33/00* (2006.01)
- *B29K 105/00* (2006.01)
- *B29K 105/04* (2006.01)

(52) U.S. Cl.
CPC .......... *C08J 9/232* (2013.01); *B29K 2033/12* (2013.01); *B29K 2105/0085* (2013.01); *B29K 2105/041* (2013.01); *B29K 2995/0063* (2013.01); *C08J 2203/14* (2013.01); *C08J 2205/044* (2013.01); *C08J 2333/12* (2013.01)

(56) References Cited

U.S. PATENT DOCUMENTS

| | | | | |
|---|---|---|---|---|
| 2007/0254972 A1* | 11/2007 | Haraguchi | ............ | C08F 220/14 521/60 |
| 2012/0205065 A1* | 8/2012 | Esser | .................... | D21H 17/42 162/164.6 |
| 2015/0175765 A1* | 6/2015 | Galewski | ............... | C08J 9/0066 521/98 |

FOREIGN PATENT DOCUMENTS

| | | |
|---|---|---|
| JP | 2-182733 A | 7/1990 |
| JP | 4-283209 A | 10/1992 |
| JP | 2005-263964 A | 9/2005 |

OTHER PUBLICATIONS

English translation of Written Opinion dated May 31, 2016 issued in corresponding patent application PCT/JP2016/056261.
International Search Report dated May 31, 2016 in PCT/JP2016/056261 filed Mar. 1, 2016.

* cited by examiner

Comparative Example 1

Comparative Example 2

EXPANDABLE ACRYLIC RESIN BEAD, EXPANDED ACRYLIC RESIN BEAD, AND EXPANDED ACRYLIC RESIN BEADS MOLDED ARTICLE

CROSS REFERENCE TO RELATED APPLICATIONS

The present application is a 35 U.S.C. § 371 national stage patent application of International patent application PCT/JP2016/056261, filed on Mar. 1, 2016, which claims the benefit of the filing date of Japanese patent application no. 2015-040572, filed on Mar. 2, 2015.

TECHNICAL FIELD

The present invention relates to an expandable acrylic resin bead, an expanded acrylic resin bead, and an expanded acrylic resin beads molded article produced by in-mold molding of the expanded acrylic resin beads.

BACKGROUND ART

As an evaporative pattern for casting, an expanded molded article made of a thermoplastic resin has conventionally been used. The expanded molded article has been used, for example, in the following casting method. First, an expanded molded article of a desired shape is coated with a mold wash. Next, the expanded molded article is embedded in sand, and a molten metal is poured onto the expanded molded article embedded in the sand. The expanded molded article is thereby thermally decomposed and replaced with the molten metal. Then, a metal cast can be produced by cooling the molten metal.

As an expanded molded article for an evaporative pattern, for example, an expanded beads molded article made of a styrene resin has been used. However, in use of an expanded styrene resin beads molded article, there has been a problem in that a large amount of soot is produced during thermal decomposition of the molded article. This soot causes contamination on the surface of the resulting metal cast and also causes pinholes to be formed inside the cast. The reason why the soot is produced can be considered because the styrene resin has an aromatic ring. To reduce the amount of soot produced, techniques in which a copolymer of a methacrylic acid ester and a styrene monomer such as styrene or α-methylstyrene is employed as an evaporative pattern (refer to Patent Documents 1 and 2) have been proposed.

PRIOR ART DOCUMENT

Patent Document

Patent Document 1: JP-A-02-182733
Patent Document 2: JP-A-04-283209

SUMMARY OF THE INVENTION

Problem to be Solved by the Invention

When an expanded beads molded article made of an acrylic resin containing a methacrylic acid ester component and an α-methylstyrene component is used as an evaporative pattern, the problem of soot production is solved to some extent. However, the rate of thermal decomposition of the expanded beads molded article is high. Consequently, there is a risk that depending on the kind of the metal employed in casting, the molten metal may not fully spread inside the mold or may run out of the mold when poured into the mold. To avoid this run-out, it is necessary, for example, to pour the molten metal carefully. Therefore, the expanded beads molded article made of an acrylic resin containing a methacrylic acid ester component and an α-methylstyrene component had a problem in terms of castability.

Meanwhile, in use of an expanded beads molded article made of an acrylic resin consisting essentially of a methacrylic acid ester copolymer, there was a risk that the expanded beads molded article may be chipped or broken when the molded article being immersed in a coating liquid used as a mold wash. That is, such expanded beads molded article made of an acrylic resin containing a methacrylic acid ester copolymer had a problem in terms of strength.

The present invention has been made in view of such a background and it is intended to provide an expanded acrylic resin beads molded article that produces little soot during burning, and has excellent castability and high strength; and an expandable acrylic resin bead and an expanded acrylic resin bead each for producing the expanded acrylic resin beads molded article.

Means for Solving the Problem

One aspect of the present invention is an expandable acrylic resin bead including a physical blowing agent; and a base resin containing a copolymer composed of 50 to 79 mol % of a methyl methacrylate component, 1 to 10 mol % of an acrylic acid ester component, and 20 to 40 mol % of a styrene component, the expandable acrylic resin bead having a water content of 0.5 mass % or less.

Another aspect of the present invention is an expanded acrylic resin bead including as a base resin, a copolymer composed of 50 to 79 mol % of a methyl methacrylate component, 1 to 10 mol % of an acrylic acid ester component, and 20 to 40 mol % of a styrene component, wherein a bulk density of the expanded acrylic resin bead is 15 to 50 $kg/m^3$, an average cell diameter of the expanded acrylic resin bead is 30 to 70 µm, and a variation coefficient of the cell diameters is 0.5 or less.

Still another aspect of the present invention is an expanded acrylic resin beads molded article which is produced by in-mold molding the expanded acrylic resin beads.

Effects of the Invention

In the above-mentioned expandable acrylic resin bead (hereinafter referred to as "expandable resin beads" in some cases), the base resin includes a copolymer of 50 to 79 mol % of a methyl methacrylate component, 1 to 10 mol % of an acrylic acid ester component, and 20 to 40 mol % of a styrene component (it is noted that the total content of the methyl methacrylate component, the acrylic acid ester component, and the styrene component amounts to 100 mol %). For this reason, the expandable resin bead makes it possible to produce an expanded acrylic resin beads molded article (hereinafter referred to as "expanded beads molded article" in some cases) that produces little soot during burning and is excellent in castabilities. Specifically, in the base resin constituting the expandable resin bead, the content of the styrene component having an aromatic ring is adjusted within the predetermined range mentioned above. Thus, the expandable resin bead makes it possible to produce an expanded beads molded article that produces little soot during burning or casting. Furthermore, the base resin constituting the expandable resin bead contains an acrylic acid ester component, and the acrylic acid ester component acts to prevent the production rate of thermal decomposition gas from excessively increasing when the expanded beads molded article is decomposition.

Meanwhile, expanded beads molded articles produced by in-mold molding expanded beads obtained from conventional expandable resin beads containing a methyl methacrylate component or an acrylic acid ester component had a problem in terms of strength. The present inventors found that the decrease in strength of the expanded molded articles is due to variation in the cell diameters of the expanded beads. The inventors also found out that the variation in the cell diameters of each expanded bead is associated with the water content of the expandable resin beads. Based on this finding, the water content of the expandable resin bead of the present invention is controlled to 0.5 mass % or less as described above. Use of such expandable resin bead prevents the cells from being coarsened and makes it possible to produce an expanded bead less varied in cell diameters. In addition, the composition of the base resin adjusted as described above leads to solution of the problem(s) concerning castabilities and/or cast surface, and also to solution of another problem concerning the strength (being chipped) of an expanded beads molded article.

Furthermore, although the expanded bead includes as the base resin, a copolymer composed of 50 to 79 mol % of a methyl methacrylate component, 1 to 10 mol % of an acrylic acid ester component, and 20 to 40 mol % of a styrene component (it is noted that the total content of the methyl methacrylate component, the acrylic acid ester component, and the styrene component amounts to 100 mol %), the cell diameters of the expanded bead is small and also the variation in the cell diameters is small. The expanded bead less varied in the cell diameters is excellent in moldability, and thus makes it possible to produce an expanded beads molded article that has higher strength.

Consequently, the expanded beads molded article produced by in-mold molding the above expanded beads has an increased strength, and thus, successfully leads to solution of the problems of being cracked and/or being chipped during casting.

MODE FOR CARRYING OUT THE INVENTION

Figure 1:
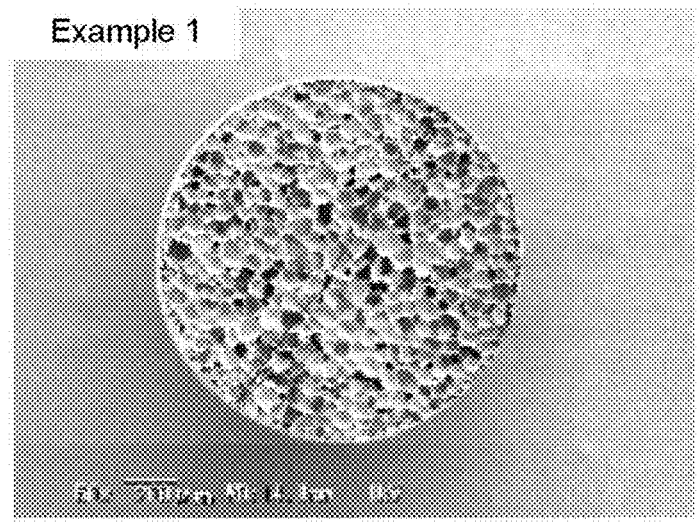
FIG. 1 is a photograph in place of a figure, showing a cross-section of an expanded bead of Example 1.

Next, preferred embodiments of the expandable acrylic resin bead, the expanded acrylic resin bead, and the expanded acrylic resin beads molded article will be described below. The base resin constituting the expandable resin bead, the expanded bead, and the expanded beads molded article is an acrylic resin, which is a copolymer composed of a methyl methacrylate component, an acrylic acid ester component, and a styrene component, as described above.

Examples of the acrylic acid ester include alkyl acrylates such as methyl acrylate, ethyl acrylate, propyl acrylate, butyl acrylate, and 2-ethylhexyl acrylate. One kind of the acrylic acid esters, or two or more kinds of the acrylic acid esters as a mixture may be used. The acrylic acid ester is preferably at least one selected from the group consisting of butyl acrylate, ethyl acrylate, and methyl acrylate. In this case, the decomposition of the resin is suppressed, so that an expanded molded article of which production rate of the thermal decomposition gas is further lower, can be obtained.

The base resin includes a copolymer of 50 mol % to 79 mol % of a methyl methacrylate component, 1 mol % to 10 mol % of an acrylic acid ester component, and 20 mol % to 40 mol % of a styrene component. It is noted that the total content of the methyl methacrylate component, the acrylic acid ester component, and the styrene component amounts to 100 mol %. That is, the copolymer is substantially composed of 50 to 79 mol % of a structural unit derived from methyl methacrylate, 1 to 10 mol % of a structural unit derived from an acrylic acid ester, and 20 to 40 mol % of a structural unit derived from styrene.

If the proportion of the methyl methacrylate component in the copolymer is beyond the above-mentioned range, there is a risk that the amount of tertiary radicals formed during decomposition may be so increased that the rate of decomposition reaction of the acrylic resin is excessively high. Meanwhile, if the proportion of the methyl methacrylate component is below the above-mentioned range, there is a risk that reduction of the amount of soot produced during burning may be difficult although the decomposition reaction is suppressed. From these viewpoints, the compounding proportion of the methyl methacrylate component in the copolymer is preferably 55 to 77 mol % and more preferably 60 to 75 mol %.

If the proportion of the acrylic acid ester component in the copolymer is beyond the above-mentioned range, there is a risk that the glass-transition point of the base resin may be excessively low, which makes molding difficult. If the proportion of the acrylic acid ester component in the copolymer is below the above-mentioned range, there is a risk that the effect of reducing the production rate of thermal decomposition gas may not be obtained. From these viewpoints, the compounding proportion of the acrylic acid ester component in the copolymer is preferably 2 to 8 mol %.

If the proportion of the styrene component in the copolymer is beyond the above-mentioned range, there is a risk that the amount of soot produced during burning or casting may be increased. On the other hand, if the proportion of the styrene component is below the above-mentioned range, there is a risk that the resulting expanded beads molded article may have a shortage of strength and fail to have good appearance. From these viewpoints, the compounding proportion of the styrene component in the copolymer is preferably 22 to 35 mol %.

In addition, from the viewpoint of castabilities, the molar ratio of the total amount of the acrylic acid ester component and the methyl methacrylate component to the amount of the styrene component is preferably 2 to 4, more preferably 2.2 to 3.8, and even more preferably 2.5 to 3.5. This molar ratio is identical to a molar ratio ($M_2/M_1$) of the total amount ($M_2$)

of the acrylic acid ester component and the methyl methacrylate component to the amount ($M_1$) of the styrene component.

The weight-average molecular weight of the copolymer is preferably 50000 to 300000. When the weight-average molecular weight is within this range, the expandability of the expandable resin bead or expanded bead is increased and, in addition, the expanded beads molded article achieves further improvement in strength and appearance. From these viewpoints, the weight-average molecular weight of the copolymer is more preferably 100000 to 250000.

The expandable acrylic resin bead is obtained by impregnating an acrylic resin bead with a physical blowing agent. Examples of the physical blowing agent include saturated hydrocarbons having 3 to 6 carbon atoms. Specifically, for example, propane, n-butane, isobutane, cyclobutane, n-pentane, isopentane, neopentane, cyclopentane, n-hexane, or cyclohexane can be used. One of the above-mentioned substances or a mixture of two or more kinds of the above-mentioned substances can be used as the physical blowing agent. Alicyclic saturated hydrocarbons such as cyclopentane and cyclohexane act not only as an expanding agent but also as a plasticizer.

The physical blowing agent preferably contains an alicyclic saturated hydrocarbon. The proportion of the alicyclic saturated hydrocarbon in the total amount of the physical blowing agent is preferably 10 mass % to 50 mass %, more preferably 15 mass % to 40 mass %, and even more preferably 20 mass % to 35 mass %. When such an alicyclic saturated hydrocarbon is used, because the alicyclic saturated hydrocarbon acts not only as an expanding agent but also as a plasticizer, the expandability and the moldability of the expandable resin bead and expanded bead are further improved.

The content of a volatile component in the expandable resin bead is preferably 10 mass % or less and more preferably 9.5 mass % or less. When the content of the volatile component falls within this range, the moldability of the expanded bead obtained by expansion of the expandable resin bead is further improved. As a result, the strength of the expanded beads molded article can be further improved. It is noted that the content of the volatile component in the expandable resin bead is around 5 mass % or more.

The water content of the expandable resin bead is not more than 0.5 mass % (inclusive of 0%), that is, the water content is 0 or 0.5 mass % or less. If the water content of the expandable resin bead is too high, coarse cells are formed during expansion of the expandable resin bead, and thus, the cells of the resulting expanded bead are made non-uniform. When such an expanded bead is employed to produce a molded article, there is a risk that the strength of the expanded beads molded article may be reduced and/or the appearance of the expanded beads molded article may be deteriorated. When the water content of the expandable resin bead is 0.5 mass % or less (inclusive of 0) as specified above, the cells in the expanded bead is prevented from being coarse, in addition, the expanded bead is prevented from being varied in cell diameters. In-mold molding employing such an expanded bead makes it possible to produce an expanded beads molded article that has higher strength. From these viewpoints, the water content of the expandable resin bead is more preferably 0.4 mass % or less. In consideration of the production cost that may be increased when the drying conditions will be made more strict, the water content is preferably 0.05 mass % or more and preferably 0.1 mass % or more.

In the case of expanded beads molded articles that have been conventionally produced and are mainly composed of styrene, water used in production of an expandable resin bead is not introduced into the expandable resin bead, and thus it has not been necessary to consider the water content of the expandable resin bead. In contrast, when a copolymer composed of a methyl methacrylate component and an acrylic acid ester component in addition to a styrene component is employed as a base resin to reduce production of the soot during casting, water used as an aqueous medium in production of an expandable resin bead tends to be easily introduced into the expandable resin bead during suspension polymerization. Consequently, the water content of the expandable resin bead is made higher. Also, it is difficult to dry the water introduced into the expandable resin bead by an ordinary drying process, and the water content of the expandable resin bead tends to be higher. Thus, an expanded bead conventionally obtained from the expandable acrylic resin bead has greatly varied in cell diameters. The present inventors have found that the strength of an expanded beads molded article is lowered because of the variation in cell diameters of the expanded bead. The present inventors have also found that the variation in cell diameters of the expanded bead is attributed to increase of the water content of the expandable resin bead, which is because the base resin of the expanded expandable bead contains a methyl methacrylate component and an acrylic acid ester component in large amounts. Based on these findings, the problem was solved by reducing the water content of the expandable resin bead composed of the above-mentioned specific base resin to a certain level as specified above.

To obtain the expandable resin bead of which the water content is very low as described above, after producing an expandable resin bead, water is removed from the produced expandable resin bead with a centrifugal separator, and subsequently the below-mentioned two-step drying process is performed.

Specifically, airflow is blown onto the expandable resin bead with a flash dryer first to make the expandable resin bead ride on the airflow in the pipe and scatter to instantaneously perform primary drying. The surface of the expandable resin bead is thus dried. At this moment, the temperature at the outlet for the airflow is, for example, from 30 to 40° C. Next, the expandable resin bead having undergone the primary drying is placed in the chamber of a fluidized-bed dryer, and air having a temperature of 10 to 30° C. is fed into the chamber to cause the expandable resin bead to float and flow in the chamber. Then, the expandable resin bead in such floating state is fully dried from the inside thereof spending 30 minutes or more. This drying step will be hereinafter referred to as secondary drying in some cases. These two drying steps makes it possible to produce an expandable resin bead having a very low water content as specified above while preventing evaporation of the volatile physical blowing agent contained in the expandable resin bead. It is preferable to perform the fluidized-bed drying after the flash drying in the two-step drying process.

The average diameter of expandable resin beads to be obtained is preferably 0.2 mm to 1.5 mm. When the average diameter falls within this range, the filling property of the expandable beads is further improved, and thus, a molded article of a complicated shape such as an evaporative pattern can be obtained more easily. In addition, the appearance of the resulting expanded beads molded article is further improved. From these viewpoints, the average diameter of the expandable resin beads is more preferably 0.3 mm to 1 mm.

The surface of the expandable resin bead can be coated with a coating agent. Examples of the coating agent include zinc stearate, calcium stearate, stearic acid triglyceride, stearic acid monoglyceride, and hydrogenated castor oil. The added amount of the coating agent is preferably from 0.01 parts by mass to 2 parts by mass relative to 100 parts by mass of the expandable resin bead.

The expandable resin bead is foamed and expanded by heating. For example, a heating medium such as steam is fed on the expandable resin bead for the expansion. More specifically, the expanded bead can be obtained through such a process to expand the expandable resin bead by heating with steam or the like employing a cylindrical foaming machine equipped with a stirrer. Because in the expandable resin bead having such a low water content as specified above, coarsening of the cells is prevented when the expandable resin bead is expanded, an expanded bead less varied in cell diameters can be produced.

Although the expanded resin bead includes the base resin including the copolymer described above, the cell diameters is small and is also less varied. Such expanded bead less varied in cell diameters is excellent in moldability, and thus, makes it possible to produce an expanded beads molded article that is excellent in strength.

The average cell diameter of the expanded bead is 30 to 70 μm. When the average cell diameter falls within this range, the expanded bead is excellent in moldability. In-mold molding of such expanded beads can produce an expanded beads molded article that is excellent in strength. From these viewpoints, the average cell diameter is preferably 35 to 60 μm and preferably 40 to 55 μm.

Furthermore, the variation coefficient of the cell diameters of the expanded bead is 0.5 or less. If the variation coefficient of the cell diameters is beyond this range, there is a risk that the strength of the expanded beads molded article that is produced by in-mold molding of the expanded beads may decrease. From this viewpoint, the variation coefficient of the cell diameters is preferably 0.45 or less.

The bulk density of the expanded bead is 15 to 50 kg/m$^3$. If the bulk density falls within this range, the expanded bead is excellent in moldability and is suitable to produce an expanded beads molded article for use as an evaporative pattern. From this viewpoint, the bulk density of the expanded bead is preferably 18 to 45 kg/m$^3$ and more preferably 20 to 40 kg/m$^3$.

An expanded beads molded article is obtained by fusing a large number of expanded beads together in a mold. An exemplary method for molding expanded beads includes in-mold molding in which the expanded beads are filled in a mold and are heated with steam or the like. The expanded beads molded article can be suitably used as an evaporative pattern for metal casting. When an expanded beads molded article produced by in-mold molding expanded beads that results from expansion of the above-mentioned expandable resin beads is used as an evaporative pattern, the above-mentioned effects to reduce soot production and to lower production rate of decomposition gas during burning, are significantly exhibited. In addition, the expanded beads molded article produced by in-mold molding the expanded beads has improved strength, and thus, successfully leads to solution of the problems of being cracked and/or being chipped during casting.

The maximum deflection of the expanded beads molded article is preferably 20 mm or more. When the maximum deflection falls within this range, the expanded beads molded article has no problem of being cracked and/or being chipped during casting, and the expanded beads molded article exerts a sufficient strength suitable for use as an evaporative pattern. The maximum deflection can be measured in accordance with JIS K 7221-2 (1999).

The expandable resin bead can be obtained by a hitherto-known method. Specifically, for example, the expandable resin beads can be produced in the following way. First, in a closed container equipped with a stirrer, an acrylic vinyl monomer such as an acrylic acid ester or methacrylic acid ester monomer, and a styrene monomer are dispersed in an aqueous medium in the presence of a suitable suspension agent and/or a suspension aid along with a plasticizer and a polymerization initiator. Then, polymerization of the monomers is initiated, and in the course of the polymerization, or after completion of the polymerization, an expanding agent is added to thereby yield the expandable acrylic resin bead.

EXAMPLES

Example 1

Hereinafter, expandable resin beads, expanded beads, expanded beads molded articles according to examples will be described. First, the expandable resin beads were produced in the following way.

First, 700 g of deionized water, 1.3 g of a suspension agent (tricalcium phosphate), 0.1 g of a surfactant (sodium dodecyl diphenyl ether disulfonate), and 1.1 g of an electrolyte (sodium acetate) were fed into an autoclave equipped with a stirrer, the inner volume of the autoclave being 3 L.

1.3 g of a polymerization initiator A, 0.7 g of a polymerization initiator B, 7.5 g of a plasticizer, and 0.4 g of a chain transfer agent (in particular, NOFMER MSD manufactured by NOF CORPORATION) were dissolved in a mixture of 350 g of methyl methacrylate, 135 g of styrene, and 15 g of n-butyl acrylate. As the polymerization initiator A, benzoyl peroxide (in particular, NYPER BW manufactured by NOF CORPORATION; a powder diluted with water) was used, as the polymerization initiator B, t-butylperoxy-2-ethylhexyl monocarbonate (in particular, PERBUTYL E manufactured by NOF CORPORATION) was used, and as the plasticizer, xylene was used. The solution thus prepared was fed into the autoclave while being stirred at a stirring speed of 400 rpm.

Next, the air inside the autoclave was replaced with nitrogen, and thereafter the autoclave was hermetically closed. Subsequently, the temperature rising in the autoclave was started with the contents in the autoclave being stirred at a stirring speed of 400 rpm. Subsequently, the temperature inside the autoclave was raised up to 80° C. spending 1.5 hours. When the temperature inside the autoclave reached 80° C., the autoclave was kept at the temperature of 80° C. for 4 hours. Thereafter, the temperature inside the autoclave was raised up to 115° C. spending 6 hours, and the autoclave was kept at the temperature of 115° C. for 5 hours. Then, the inside of the autoclave was cooled to lower the temperature to 36° C. spending 4 hours. When the above-described temperature rising from 80° C. to 115° C. was started, 80 g of an expanding agent was fed into the autoclave spending 30 minutes. As the expanding agent, pentane (in particular, a mixture of 80 mass % of n-pentane and 20 mass % of isopentane) was used. After the expanding agent was fed, the stirring speed was reduced to 350 rpm.

After cooling the inside of the autoclave as described above, the contents, that is, expandable resin beads, were taken out from the autoclave. Nitric acid was then added to the expandable resin beads to dissolve tricalcium phosphate adhered to the surfaces of the expandable resin beads.

Subsequently, the expandable resin beads were subjected to water removal and washing with a centrifugal separator.

After water was removed from the expandable resin beads with the centrifugal separator, the expandable resin beads were dried in the following way. That is, first, airflow was blown onto the expandable resin beads with a flash dryer to make the resin beads ride on the airflow in the pipe and scatter to perform drying. This drying is primary drying, and the temperature at the outlet for the airflow in the primary drying was 30 to 40° C. (35° C. on average). Next, the expandable resin beads having undergone the first drying were conveyed to a fluidized-bed dryer, air having a temperature of 25° C. was fed into the chamber of the dryer to cause the expandable resin beads to float in the chamber, and the expandable resin beads in such floating state were dried spending 30 minutes or more. This drying step is the secondary drying.

Next, the expandable resin beads were sieved to collect beads with a diameter of 0.3 to 0.6 mm. Then, to 100 parts by mass of the expandable resin beads, a mixture of 0.10 parts by mass of zinc stearate and 0.15 parts by mass of calcium stearate were added to be mixed with the beads. In such a way, the expandable resin beads were coated with zinc stearate and calcium stearate.

Next, the expandable resin beads were expanded to produce expanded beads, and using these expanded beads, an expanded beads molded article was produced. Specifically, first, 300 g of the expandable resin beads were placed in a normal pressure pre-expander having a volume of 30 L. Next, with the expandable resin beads being stirred, steam was fed into the pre-expander to expand the expandable resin beads, and thereby producing expanded beads having a bulk density of 22 kg/m$^3$. The method of measuring the bulk density will be described below. The expanded beads thus obtained were subjected to measurement of the cell diameters as described below. A scanning electron microscope photograph at a magnification of 50 times, of a cross-section of one of the expanded beads is shown in FIG. 1.

Next, the expanded beads obtained in the above-mentioned manner were left for one day at room temperature to be aged, and then were filled into the cavity of a mold of a molded article molding machine (in particular, DSM-0705 VS manufactured by DABO JAPAN, CO., LTD.). Subsequently, the expanded beads were heated for 10 seconds by feeding steam into the cavity, and then, were cooled for a given period of time. Thereafter, an expanded beads molded article was taken out from the mold. The cavity of the mold has a rectangular parallelepiped shape, the dimensions of which are 300 mm long, 75 mm wide, and 25 mm thick. The resulting expanded beads molded article was dried for one day at 40° C. and subjected to various evaluations described below. The density of the expanded beads molded article was 22 kg/m$^3$.

Examples 2 to 4

Figure 2:
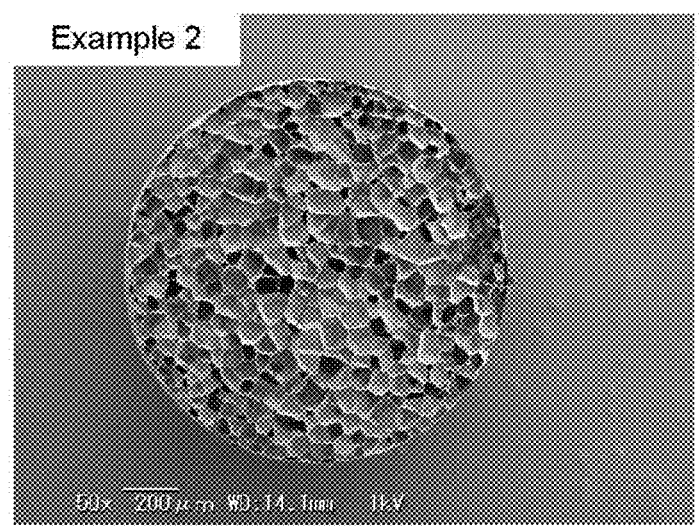
FIG. 2 is a photograph in place of a figure, showing a cross-section of an expanded bead of Example 2.
Figure 3:
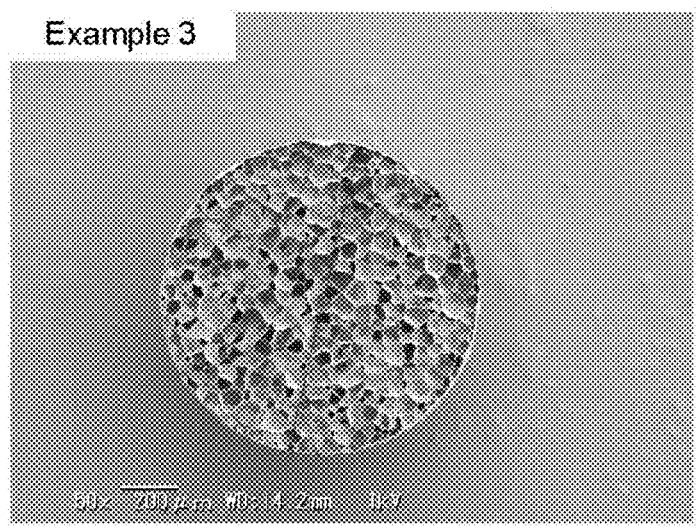
FIG. 3 is a photograph in place of a figure, showing a cross-section of an expanded bead of Example 3.
Figure 4:
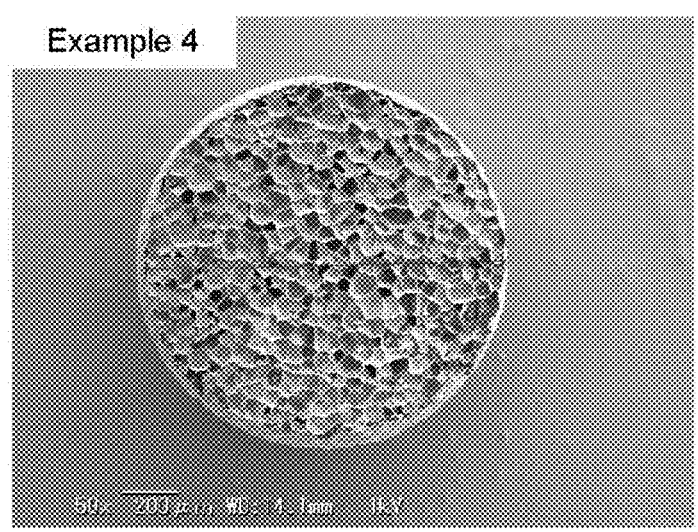
FIG. 4 is a photograph in place of a figure, showing a cross-section of an expanded bead of Example 4.

Expandable resin beads, expanded beads, and expanded beads molded articles were produced in the same manner as in Example 1, except that the conditions were varied as shown in Table 1 described below. Scanning electron microscope photographs (at a magnification of 50 times) of cross-sections of the expanded beads according to Examples 2 to 4 are shown in FIGS. 2 to 4, respectively.

Comparative Example 1

Figure 5:
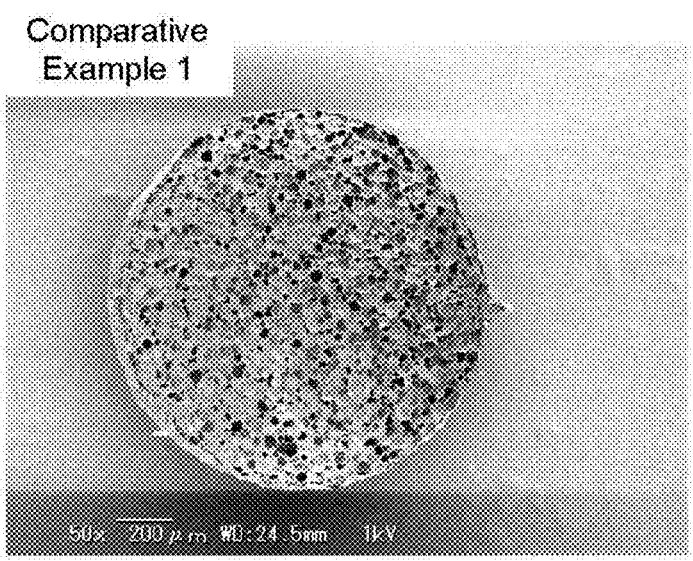
FIG. 5 is a photograph in place of a figure, showing a cross-section of an expanded bead of Comparative Example 1.

In this example, as expandable resin beads, expandable styrene resin beads, the base resin of which is a polymer composed of 100 mol % of styrene (in particular, STYRODIA manufactured by JSP Corporation), were used. For drying the expandable styrene resin beads in production, only flash drying was performed. That is, although the flash drying was performed in the same manner as in Example 1, fluidized-bed drying was not performed thereafter. Using the expandable styrene resin beads thus obtained, expanded beads and an expanded bead molded article were produced in the same manner as in Example 1. A scanning electron microscope photograph at a magnification of 50 times, of a cross-section of one of the expanded beads according to Comparative Example 1 is shown in FIG. 5.

Comparative Example 2

Figure 6:
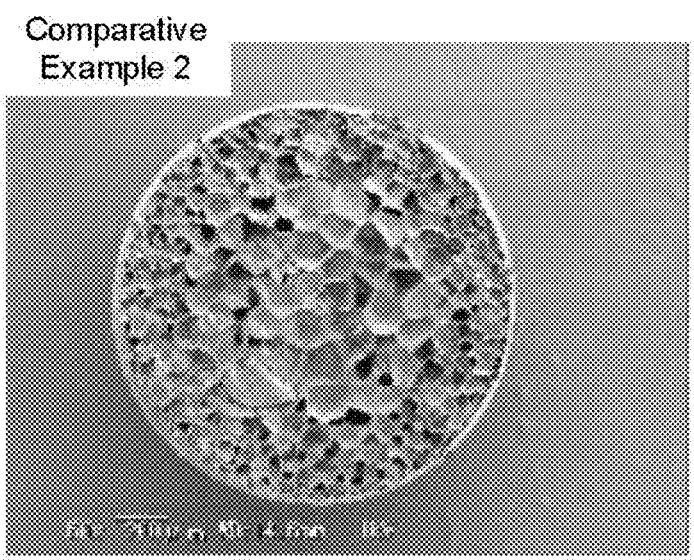
FIG. 6 is a photograph in place of a figure, showing a cross-section of an expanded bead of Comparative Example 2.

In this example, expandable resin beads, expanded beads, and an expanded beads molded article were produced in the same manner as in Example 1, except for omitting the fluidized-bed drying in the drying process. A scanning electron microscope photograph at a magnification of 50 times, of a cross-section of one of the expanded beads according to Comparative Example 2 is shown in FIG. 6.

Comparative Example 3

Figure 7:
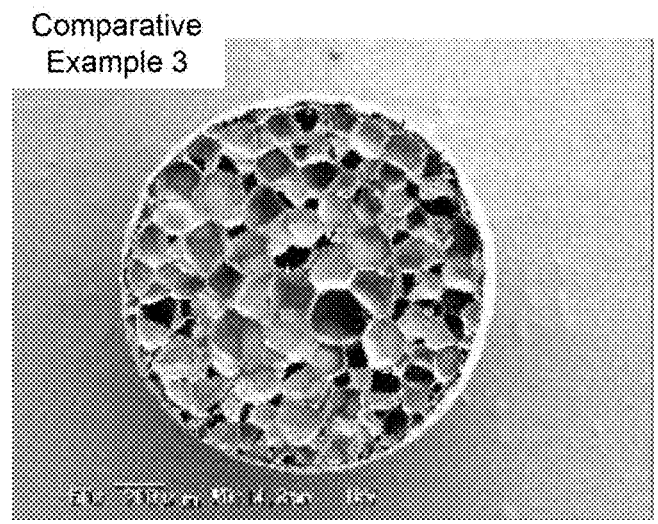
FIG. 7 is a photograph in place of a figure, showing a cross-section of an expanded bead of Comparative Example 3.

In this example, expandable resin beads, expanded beads, and an expanded beads molded article were produced in the same manner as in Example 1, except for changing the condition of temperature in the flash dryer to be 25° C. and omitting the fluidized-bed drying. A scanning electron microscope photograph at a magnification of 50 times, of a cross-section of one of the expanded beads according to Comparative Example 3 is shown in FIG. 7.

Comparative Example 4

Figure 8:
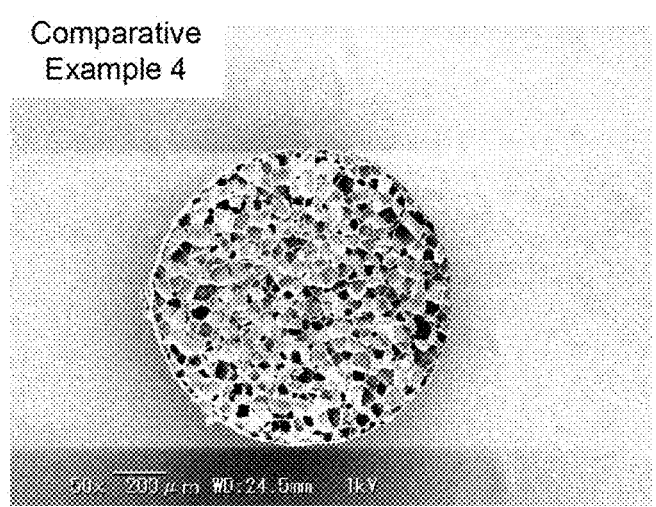
FIG. 8 is a photograph in place of a figure, showing a cross-section of an expanded bead of Comparative Example 4.

In this example, expandable resin beads, expanded beads, and an expanded beads molded article were produced in the same manner as in Example 1, except for changing the proportions of constituents of the acrylic resin as listed in Table 1 described below. A scanning electron microscope photograph at a magnification of 50 times, of a cross-section of one of the expanded beads according to Comparative Example 4 is shown in FIG. 8.

With regard to the above-mentioned expandable resin beads produced in each Example and each Comparative Example, the weight-average molecular weight, the volatile component content, the water content, and the average diameter were measured in the following way. In addition, the bulk density, the average cell diameter, the standard deviation of the cell diameters, and the variation coefficient of the cell diameters were measured in the following way. The results are shown in Table 1.

[Measurement of Weight-Average Molecular Weight]

The weight-average molecular weight Mw of the acrylic resin in the expandable resin beads was measured. The weight-average molecular weight was measured by Gel permeation chromatography (GPC) using polystyrene (i.e., "PS") as a standard substance. Specifically, the measurement was conducted using HLC-8320 GPC manufactured by Tosoh Corporation under the conditions where the sample concentration (in particular, the concentration in a THF solution) was 0.001 mass %, the carrier was tetrahydrofuran (i.e., "THF"), the THF flow rate was 0.6 ml/min, the column used for the sample was TSKgel super HM-H, the column used for the reference was TSKgel super HR-C, the column temperature was 40° C., and the detector was a RI detector (in particular, a differential refractive index detector manufactured by Tosoh Corporation). That is, the expandable resin beads were dissolved in tetrahydrofuran (THF), and were subjected to gel permeation chromatography (GPC) to measure the molecular weight. The measured value was calibrated with a reference standard PS to determine the weight-average molecular weight. The calibration was done on the basis of a calibration curve that was prepared using the reference standard PS manufactured by Tosoh Corporation.

[Measurement of Volatile Component Content]

About 1 g of the expandable resin beads was accurately weighed to the fourth decimal places. The weighed expandable resin beads were kept in a hot air dryer for 4 hours with the temperature being set at 120° C. Next, the expandable resin beads were cooled to room temperature and then weighed. Based on the difference in weights before and after heating, the total amount of the volatile component was determined, and then, the amount of the volatile component was obtained by subtracting the water content from the total amount of the volatile component. The calculation equations are as follows.

Total volatile component content (mass %)={Weight (g) before heating−weight (g) after heating}+weight (g) before heating×100

Volatile component content (mass %)=Total volatile component content (mass %)−water content (mass %)

[Measurement of Water Content]

First, the expandable resin beads were weighed to 0.28 g. Next, the expandable resin beads were heated to 160° C. using a heating water evaporator to evaporate water inside the expandable resin beads, and the water content was measured by Karl Fischer titration (in particular, coulometric titration) using AQ-6, a Karl Fischer titrator manufactured by HIRANUMA SANGYO Co., Ltd.

[Measurement of Average Diameter]

The expandable resin beads were sieved through sieves in accordance with the JIS standard (in particular, JIS Z 8801), and the weight of the expandable resin beads retained on the sieves was measured to determine the weight fraction of each size class distribution. Using the Rosin-Rammler equation the bead diameter at 63 wt % in the cumulative undersize distribution was obtained. This bead diameter was defined as the average diameter.

[Measurement of Bulk Density]

First, the expanded beads were air-dried for one day, and then were filled in a measuring cylinder up to the scale mark showing one liter. Then, the mass (in the unit of gram) of the expanded beads per one liter was weighed. The mass per one liter was subjected to unit conversion to calculate the bulk density (in the unit of $kg/m^3$).

[Cell Diameter]

The average cell diameter of the expanded beads was measured in the following way. First, the expanded beads were subjected to a pretreatment in which a black dye was applied to a cross-section of each expanded bead and then dried at 40° C. for one day. Next, an enlarged photograph of the central portion of the cross-section of the expanded bead was captured. The magnification of the enlarged photograph was 50 times. Next, the diameter of each cell observed in the photograph was measured using NS2K-pro, an image processing software manufactured by Nanosystem Corporation. To perform the measurement, the settings in the image processing were adjusted as follows. Specifically, "Measurement of Circle-equivalent Diameter" was set to "8 neighbours", "Scale Setting" was set to "1 pixel", "Area Setting" was set to "(1, 1) to (1598, 1065), "Monochrome Conversion" was set to "Convert", "Smoothing Filter" was set to "3×3, 8 neighbours, Number of Processing: 3", "Density irregularity Correction" was set to "Magnitude: 14", "NS Binarization" was set to "Definition: 10, Sensitivity: 2, Denoising, Intensity range: 0 to 255", "Erosion" was set to "8 neighbours, Number of processing: 3", "Image selection on the basis of dimensions" was set to "Select (100000000 to ∞ $\mu m^2$) only, around 8", and "Expansion independent from surroundings" was set to "8 neighbours, Number of processing: 4". The average cell diameter was measured similarly for each of twenty expanded beads picked up randomly. The arithmetic mean of the twenty average values was defined as an average of the cell diameters of each expanded bead. The variation coefficient of the cell diameters is a value determined by dividing the standard deviation V (mm) of each cell diameter Di by the average cell diameter Day (mm), and is a measure indicating the variation range of the cell diameters. The standard deviation is determined by the following equation (I).

$$V(\text{mm})-[\Sigma(Di-Dav)^2/(m-1)]^{1/2} \quad (I)$$

In addition, the appearance, the castabilities, and the strength of the expanded beads molded articles according to each Example and each Comparative Example were evaluated by the procedures in the following way. The results are shown in Table 1.

[Appearance]

The expanded beads molded articles having a density of 22 $kg/m^3$ were visually checked for melting and discontinuity on the surface of the thereof. Then, evaluation was made according to the following criteria. That is, a rating "A" was given in the case where no melting and no discontinuity was observed on the surface of the expanded beads molded article, a rating "B" was given in the case where melting and/or discontinuity were (was) slightly found on the surface of the expanded beads molded article, and a rating "C" was given in the case where melting and/or discontinuity were (was) found a lot on the surface of the expanded beads molded article.

[Castabilities]

For the castabilities, the evaluation was done on the basis of the cast surface and the progress of casting. Specifically, metal casting was performed using the expanded beads molded article as an evaporative pattern. The expanded beads molded article had a density of 22 $kg/m^3$ and has a rectangular parallelepiped shape having dimensions of 75 mm×150 mm×40 mm. Full-mold casting method was adopted for the casting. Spheroidal graphite cast iron (i.e., "FCD") was employed as the metal to be casted, a gas-hardening alkali phenol binder resin (in particular, KAO STEP C-800 manufactured by Kao Corporation) was employed as the casting sand, and a zircon-based mold wash (in particular, Oka Super 3021 manufactured by Okazaki Kosanbutsu K.K.) was employed as the mold wash. The evaporative pattern, a runner, and a gate were placed in a cast frame, and the sand was filled therein. After that, carbon dioxide gas was fed to the cast frame so as to fill and spread over the inside of the cast frame thereby hardening the sand. A sprue (inlet) for pouring molten metal and a relief port were attached, and heated molten metal was fed through the sprue to perform casting. The casting time was about 10 seconds, and the temperature of the molten metal during the casting was about 1400° C. When the metal had cooled down after completion of the casting, the resulting cast metal was taken out from the cast frame and was subjected to shot blasting.

(Evaluation of Cast Surface)

The cast metal produced as described above was visually checked for soot defects (also referred to as "carbon defects") and was rated using ratings A to C listed below. A soot defect means a hollow or a recess that is formed on the surface of, or in the inside of the cast metal due to the thermal decomposition product of the expanded beads molded article (i.e., evaporative pattern) being unsuccessfully discharged and remaining in the sand mold. The cases where no or few soot defects is (are) observed corresponds to a case in which the amount of soot production is almost null or small.

A: Case in which no soot defect was found in the cast metal.

B: Case in which soot defects were slightly found in the cast metal.

C: Case in which soot defects were found a lot in the cast metal.

(Condition During Pouring)

The molten metal that was poured into the sprue as described above was checked for spitting during the pouring, and rated using the following ratings A to C.

A: Case in which no spitting occurred.

B: Case in which spitting slightly occurred.

C: Case in which spitting severely occurred.

[Strength]

The strength of each molded article was evaluated on the basis of the deflection under maximum load. Specifically, first, a specimen having a length of 300 mm, a width of 75 mm, and a thickness of 25 mm was formed from the expanded beads molded article having a density of 22 kg/m³. This specimen was subjected to a three-point flexural test using Shimadzu Autograph manufactured by Shimadzu Corporation in accordance with "Method for Determination of Flexural Properties of Large-Size Specimen" specified in JIS K 7221-2 (1999), Appendix 1. The distance between the lower supports in the three-point flexural test was 200 mm. The deflection under maximum load was measured at a testing speed of 10 mm/min.

TABLE 1

| | | | | Examples | | | | Comparative Examples | | | |
|---|---|---|---|---|---|---|---|---|---|---|---|
| Example No. | | | | 1 | 2 | 3 | 4 | | | | |
| Comparative Example No. | | | | | | | | 1 | 2 | 3 | 4 |
| Expandable Resin Bead | Acrylic Resin | Methyl Methacrylate | mol % | 70 | 70 | 70 | 70 | — | 70 | 70 | 87 |
| | | Styrene | mol % | 27 | 25 | 27 | 27 | 100 | 27 | 27 | 10 |
| | | N-butyl Acrylate | mol % | 3 | 5 | — | 3 | — | 3 | 3 | 3 |
| | | Methyl Acrylate | mol % | — | — | 3 | — | — | — | — | — |
| | | Weight-average Molecular Weight Mw | ×10⁴ g/mol | 20.4 | 20.3 | 22.5 | 21.5 | 26.5 | 20.4 | 21.1 | 25.6 |
| | Drying Conditions | Outlet Temperature during Flash Drying | ° C. | 30-40 | 30-40 | 30-40 | 30-40 | 30-40 | 30-40 | 25 | 30-40 |
| | | Fluidized-bed Drying | — | Room Temperature for 60 min | Room Temperature for 60 min | Room Temperature for 90 min | Room Temperature for 60 min | Not done | Not done | Not done | Room Temperature for 60 min |
| | | Volatile Component Content | mass % | 7.6 | 7.2 | 7.5 | 7.3 | 7.3 | 7.5 | 7.6 | 6.8 |
| | | Water Content | mass % | 0.38 | 0.33 | 0.19 | 0.29 | 0.16 | 0.90 | 2.10 | 0.43 |
| | | Average Diameter | mm | 0.45 | 0.48 | 0.44 | 0.45 | 0.45 | 0.43 | 0.44 | 0.42 |
| Expanded Resin Bead | | Bulk Density | kg/m³ | 22 | 22 | 22 | 22 | 22 | 22 | 22 | 22 |
| | Cell Diameter | Average | μm | 50.4 | 49.3 | 50.0 | 45.8 | 42.1 | 56.7 | 75.8 | 43.7 |
| | | Standard Deviation | μm | 20.0 | 18.0 | 20.0 | 15.3 | 12.7 | 43.3 | 45.0 | 13.9 |
| | | Variation Coefficient | — | 0.4 | 0.4 | 0.4 | 0.3 | 0.3 | 0.8 | 0.6 | 0.3 |
| Expanded Resin Beads Molded Article | | Appearance | — | A | A | A | A | A | A | A | C |
| | Castabilities | Cast Surface | — | A | A | A | A | C | A | — | — |
| | | Condition during Pouring | — | A | A | A | A | A | A | — | — |
| | | Strength (Maximum Deflection) | mm | 27.6 | 26.9 | 24.7 | 25.1 | 25.6 | 16.5 | 14.7 | 13.6 |

As shown in Table 1, it is apparent that use of such expandable resin beads including a copolymer composed of monomers in predetermined ratios, i.e. 50 mol % to 79 mol % of a methyl methacrylate, 1 mol % to 10 mol % of an acrylic acid ester, and 20 mol % to 40 mol % of styrene and having a water content of 0.5 mass % or less, makes it possible to obtain expanded beads, the cell diameters of which have a small variation coefficient (refer to Examples). Also, when the expandable resin beads according to Examples are expanded, it is possible to prevent the cells from being coarsened, and to obtain expanded beads less varied in cell diameters (refer to FIGS. 1 to 4). And, use of such expanded beads makes it possible to obtain an expanded beads molded article that produces little soot during burning, and has excellent castabilities and high strength. In addition, such an expanded resin molded article also has good appearance.

In contrast, in Comparative Example 1, because the expandable resin beads include a styrene component in a large content, the amount of soot produced during burning of the expanded beads molded article was so large that the cast metal suffered soot defects. Meanwhile, it is found that such styrene resin expandable beads according to Comparative Example 1 can produce an expandable resin bead having a low water content through only flash drying. On the other hand, in expandable resin beads containing an acrylic resin as a base resin, the water content is high as in Comparative Example 2 when expandable resin beads are prepared through only flash drying. In expanded beads produced from the expandable resin beads having such high water content, the variation coefficient in the cell diameters was so high that the strength of the expanded beads molded article decreased. As shown in FIG. 6, coarsened cells were observed in the expanded beads according to Comparative Example 2.

Also in Comparative Example 3, because the water content of the expandable resin beads was high, the cells of the expanded beads were coarsened, and the variation coefficient of the cell diameters was high, so that the strength of the expanded beads molded article further decreased. As shown in FIG. 7, the cells were coarser in the expanded beads of Comparative Example 3 than in those of Comparative Example 2 (refer to FIG. 6).

In Comparative Example 4, the amount of the styrene component contained in the expandable resin beads was small. For this reason, the appearance of the expanded beads molded article was poor and the strength was insufficient, despite of the fact that the water content of the expandable resin beads was low.

The invention claimed is:

1. An expandable acrylic resin bead comprising:
   a physical blowing agent; and
   a base resin comprising a copolymer comprising 50 to 79 mol % of a methyl methacrylate component, 1 to 10 mol % of an acrylic acid ester component, and 20 to 40 mol % of a styrene component,
   wherein the acrylic acid ester component comprises at least one selected from the group consisting of butyl acrylate, ethyl acrylate, and methyl acrylate;
   wherein a total content of the methyl methacrylate component, the acrylic acid ester component, and the styrene component amounts to 100 mol %;
   wherein the expandable acrylic resin bead has a water content of 0.05 to 0.4 mass % and a content of a volatile component of 5 to 10 mass %, and
   wherein a molar ratio of a total amount of the acrylic acid ester component and the methyl methacrylate component to an amount of the styrene component is in a range of 2 to 3.8.

2. The expandable acrylic resin bead according to claim 1, wherein a molar ratio of a total amount of the acrylic acid ester component and the methyl methacrylate component to an amount of the styrene component is in a range of 2.2 to 3.5.

3. The expandable acrylic resin bead according to claim 1, wherein the copolymer has a weight-average molecular weight of 50000 to 300000.

4. The expandable acrylic resin bead according to claim 1, wherein the copolymer consists essentially of the methyl methacrylate component, the acrylic acid ester component, and the styrene component.

* * * * *